No. 752,190. PATENTED FEB. 16, 1904.
G. G. TIEMAN.
WHEELBARROW.
APPLICATION FILED JULY 16, 1903.
NO MODEL.
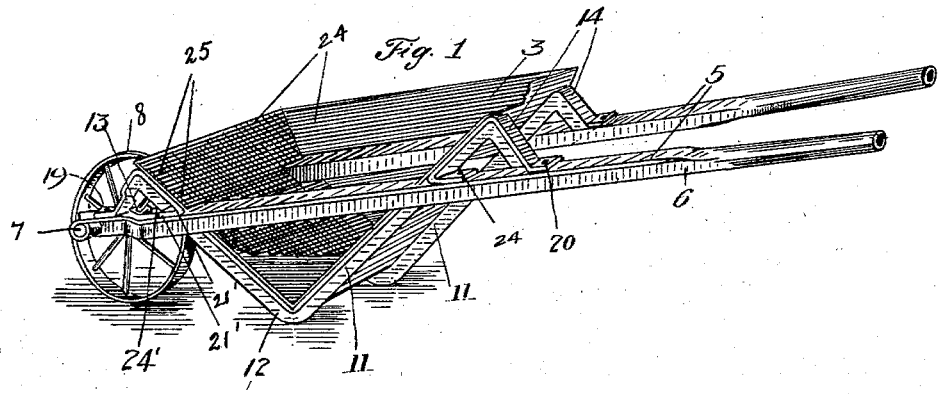
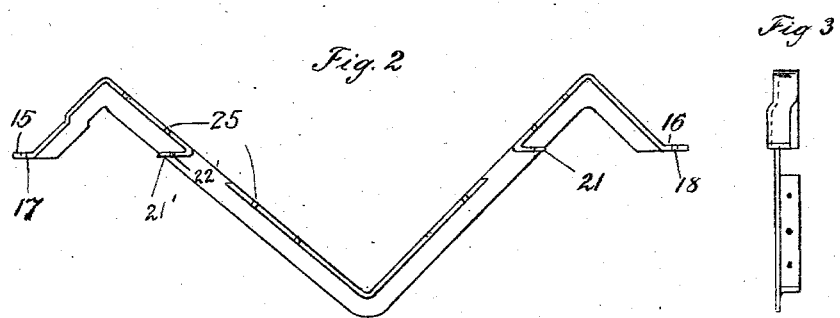
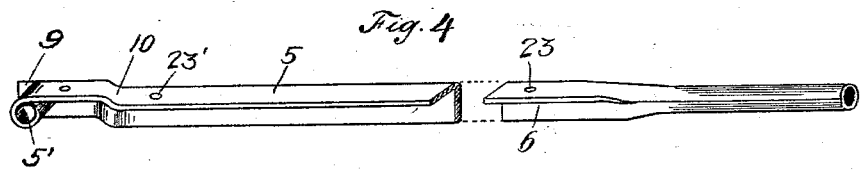
WITNESSES
INVENTOR
George G. Tieman
BY Robt. Klotz
ATTORNEY No. 752,190.

Patented February 16, 1904.

UNITED STATES PATENT OFFICE.

GEORGE GOTTFRIED TIEMAN, OF CHICAGO, ILLINOIS.

WHEELBARROW.

SPECIFICATION forming part of Letters Patent No. 752,190, dated February 16, 1904.

Application filed July 16, 1903. Serial No. 165,777. (No model.)

*To all whom it may concern:*

Be it known that I, GEORGE GOTTFRIED TIEMAN, a citizen of the United States, residing at Chicago, in the county of Cook and State of Illinois, have invented certain new and useful Improvements in Wheelbarrows, of which the following is a specification.

This invention relates to the construction of wheelbarrows; and its object is to so dispose and form the structural material as to obtain the greatest possible strength, permanency, rigidity, and freedom from joints for a given weight of said material—that is, a wheelbarrow of exceptionally lasting qualities capable of withstanding hard usage in ordinary service without getting out of order.

A further object of the invention is to make possible the use of angle-irons throughout the body of the frame in such a manner that two pairs of said angle-irons will serve as handles, box or platform support, journal-boxes or axle-bearings, legs and body-braces, by providing a novel formation of said angle-irons; and the invention consists in the novel details of construction and combinations of parts adapted to attain the above ends hereinafter described in detail, illustrated in the drawings, and incorporated in the claims.

The invention will be readily understood by reference to the accompanying drawings, forming a part of this specification, and in which—

Figure 1 is a perspective view of a wheelbarrow embodying my invention. Fig. 2 is an enlarged detail view. Fig. 3 is a view of the detail shown in Fig. 2, taken on a plane at right angles to the plane of said figure. Fig. 4 is an enlarged detail view of the handle portion.

In the drawings, 2 represents the non-parallel bars or shafts supporting the bed or platform 3. Said shafts are curved transversely at their diverging ends into substantially tubular handles 4 by forming the wings 5 and 6 of the angle-iron out of which each of said shafts is made into tubular shape, as shown. The converging ends of said shafts are split at the junction of the wings 5 and 6 and the wing 5 curved into a tubular bearing, eye, or journal-box 5' for the spindle or axle 7 of the wheel 8. The opposite wing 6 is preferably cut off at the bearing, as shown at 9 in Fig. 4. The converging ends of the shafts are bent twice, as shown at 10 in Fig. 4, to bring the bearings for the spindle or axle closer together or up to the hub of the wheel.

In the preferred embodiment of my invention the part known as the "bed," "body," or "box" takes the form of a hopper-shaped scoop, having an angle-iron frame consisting of the angle-irons 11 and 11', each of which is bent three times, substantially at right angles, as shown, providing the legs or supports 12 and the front braces 13 and rear braces 4. The extreme ends of the braces 13 and 14 have the wings 5 of the angle-iron bent at obtuse angles and the wings 6 cut off, whereby feet or lugs 15 and 16 are formed, in which are suitable apertures 17 and 18 for the bolts 19 and 20, which also have corresponding apertures in the shafts. 21 21' represent similar lugs or feet formed out of the wings 5 between the leg portions 12 and the braces 14 and 13, respectively. Said feet are also provided with apertures 22 22', registering with shaft-apertures 23 23', for bolts or screws 24 24'. The angles constituting the legs 12 provide a hopper or box frame for the scoop or hopper 24, consisting of boards bolted to said frame through holes 25 therein. (Shown by dotted lines in Fig. 2.)

The angle-iron construction of the shafts provides great strength and rigidity against the weight of the load as well as side strains, and the hopper-frame is likewise rigid along vertical and horizontal planes. The handles and wheel-spindle bearings being integral with the shafts, the joints common in wheelbarrows upon which the greatest strains are imposed are obviated entirely, and as the feet or lugs of the scoop or hopper frame rest upon the shafts instead of being bolted through the sides thereof the strain imposed by the load does not seriously tax the junctures between said shafts and frame.

It is obvious that the embodiment of my invention may be modified, especially with respect to the hopper-frame, without departing from the spirit of the invention, and I therefore do not wish to confine my invention to the specific construction herein shown and described.

Having thus described my invention, I claim as new and desire to secure by Letters Patent—

1. A wheelbarrow consisting of a pair of angle-iron shafts bent into, respectively, integral tubular handles and cylindrical journal boxes or bearings, and a second pair of angle-irons secured to said shafts, said second pair being bent into a box or scoop frame and extending below said handles, and the box or scoop serving substantially as legs for said barrow.

2. A wheelbarrow-frame supporting the wheel and bed or scoop, consisting of two pairs of angle-irons, one of said pairs being bent to form, respectively, tubular handles and cylindrical journal-boxes, the other pair being bent to form front and rear bed-braces, bed-frame and legs, said legs constituting the bottom frame of the bed which extends below said handles.

3. A wheelbarrow-frame consisting of two angle-irons curved at one end into substantially cylindrical handles and at the opposite end into eyes constituting bearings for the wheel-spindle, said frame, together with a suitable bed or box and wheel constituting substantially a complete barrow supported on said wheel and bed or box, the latter extending substantially to the plane of the wheel-base.

4. In a wheelbarrow, a bed or box supporting frame consisting of a pair of angle-irons arranged non-parallel, said angle-irons having their diverging ends curved into tubular form and their converging ends curved into loops or cylindrical bearings for the axle of the wheel, said loops being formed out of one wing of each said angle-iron and the bed supported on the plane of the wheel-base.

5. In a wheelbarrow, a frame for the bed and wheel comprising a pair of angle-iron shafts curved at their opposite ends into, respectively, journal-boxes and handles and a pair of angle-irons secured to said first-mentioned pair formed into, respectively, legs, front and rear bed braces and frame, and the bed extending below said shafts.

6. In a wheelbarrow, a frame for the box and wheel comprising a pair of angle-iron shafts curved at their opposite ends into, respectively, journal-boxes and handles and a second pair of angle-irons bent at right angles whereby is provided a frame for a hopper-shaped body or box extending below said shafts as well as front and rear braces supporting said body upon said shafts, and suitable means for securing together above-mentioned parts.

7. In a wheelbarrow, a pair of non-parallel shafts and handles consisting of a pair of angle-irons having the respective wings of each curved toward each other at one end into handles of tubular cross-section, the opposite ends of said angle-irons being split between the wings thereof and one of said wings on each angle-iron curved into an axle or wheel-spindle bearing, a scoop or box for said wheelbarrow having a frame consisting of a pair of angle-irons bent into substantially five angles, whereby is provided legs for said wheelbarrow, a body and body-supporting frame, and suitable bolts and apertures therefor for securing said parts together.

In testimony whereof I have hereunto set my hand in the presence of two subscribing witnesses.

GEORGE GOTTFRIED TIEMAN.

Witnesses:
WM. M. KINGSLEY,
PAUL GERHARDT.